Feb. 10, 1953 — R. E. DIETERICH — 2,628,124
VEHICLE WINDSHIELD SHADE
Filed Aug. 19, 1949 — 4 Sheets-Sheet 1
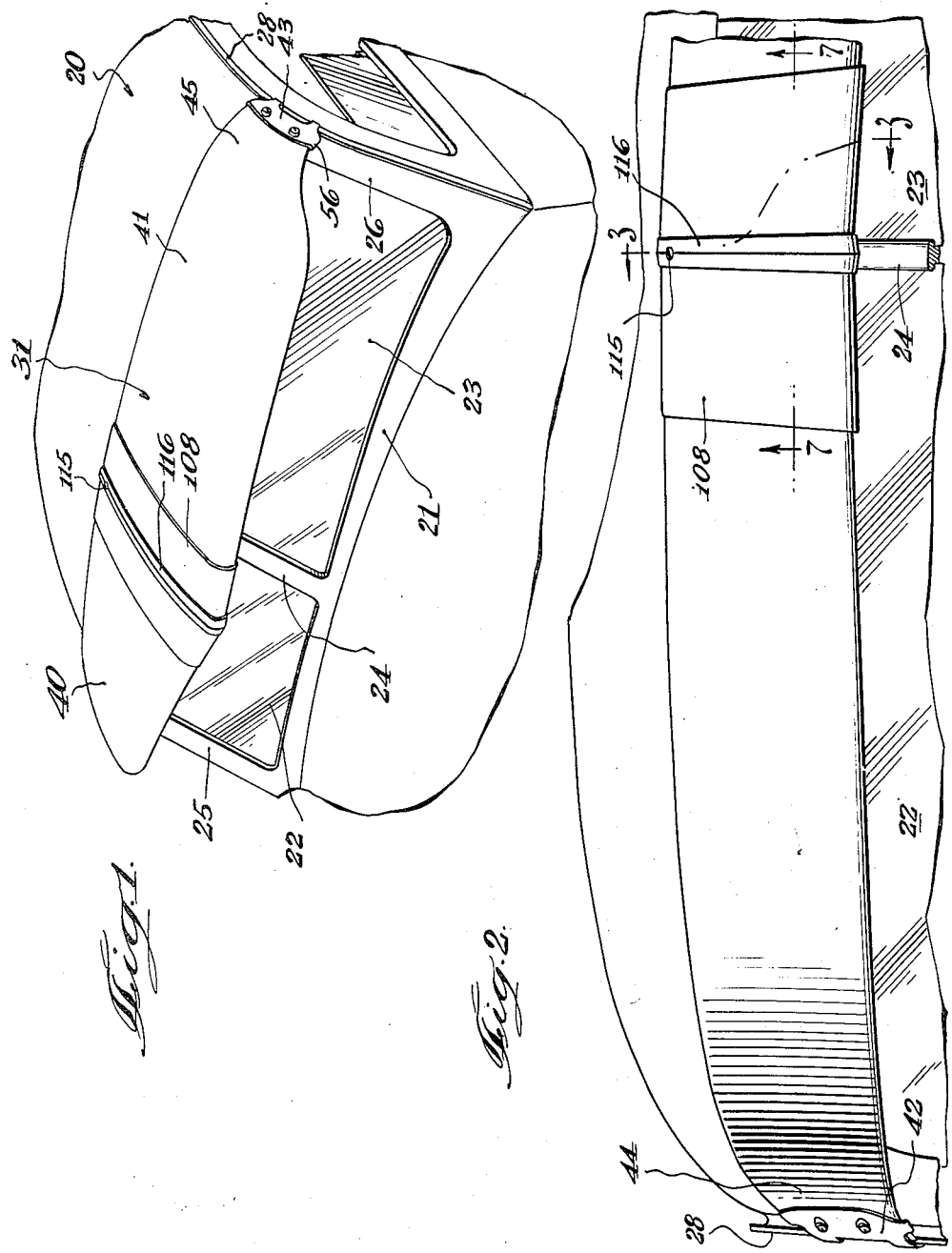
Inventor:
Richard E. Dieterich
By J. Irving Silverman
Attorney

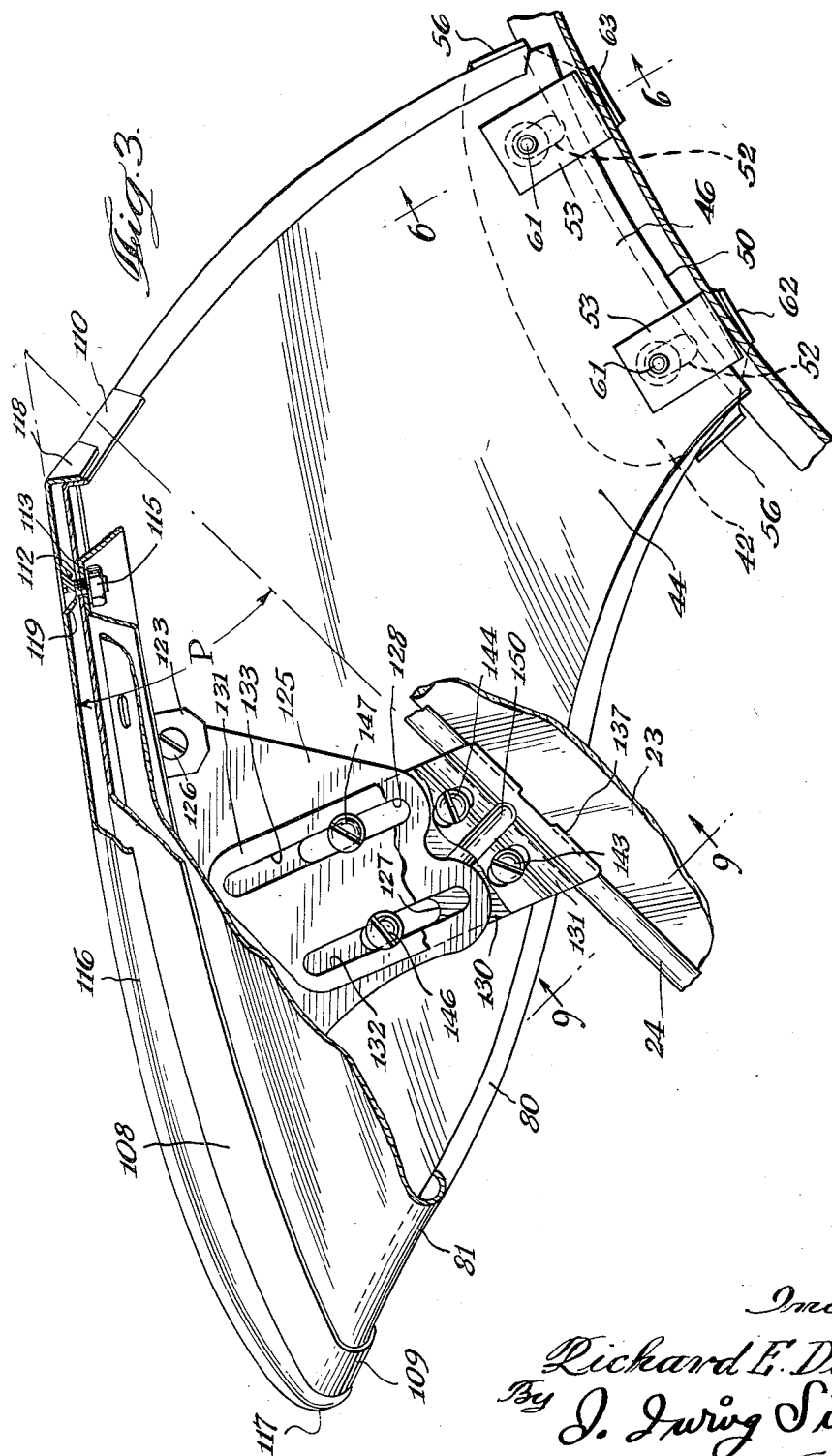

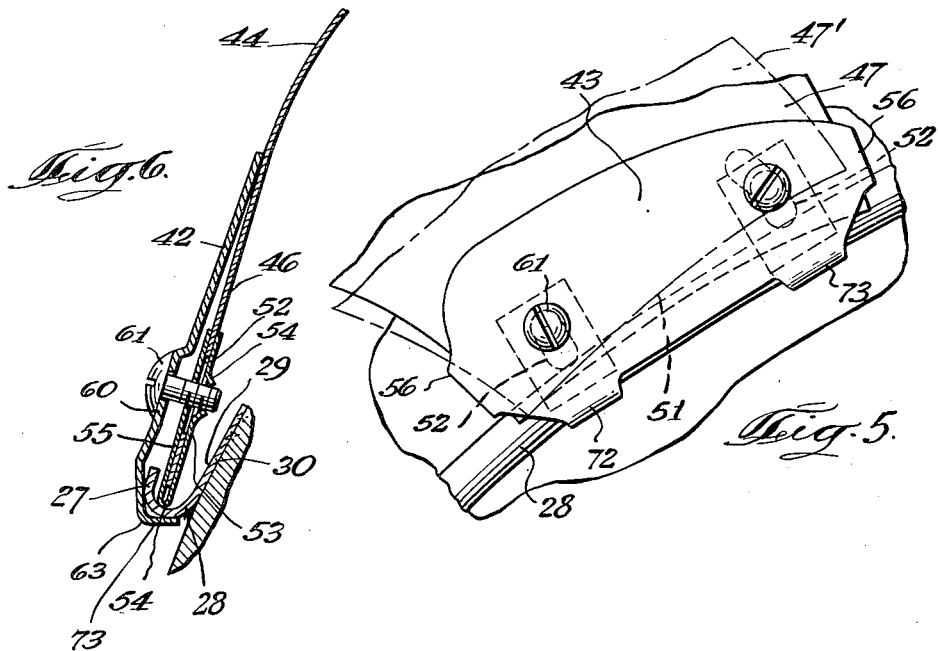
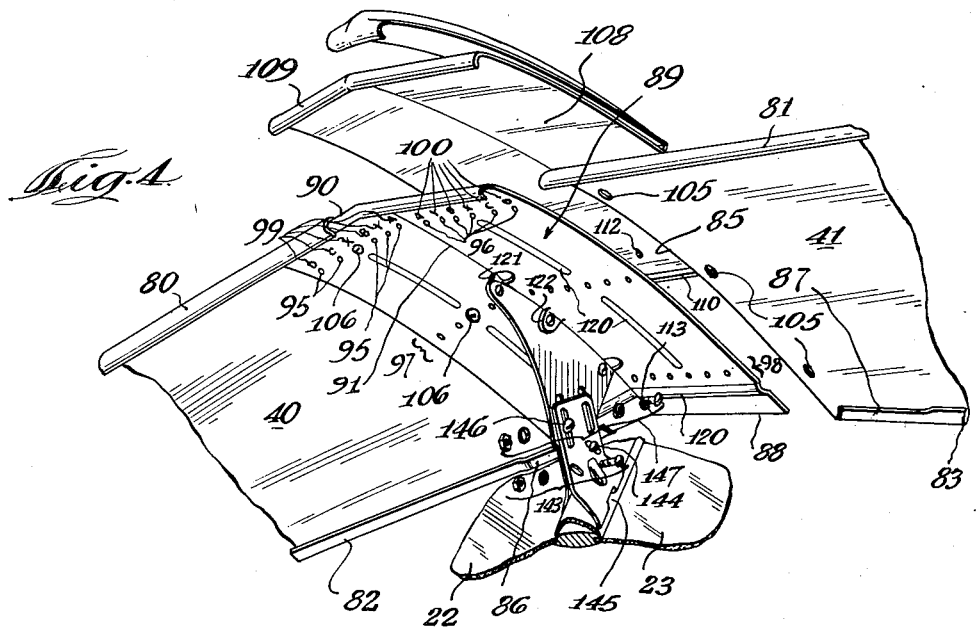

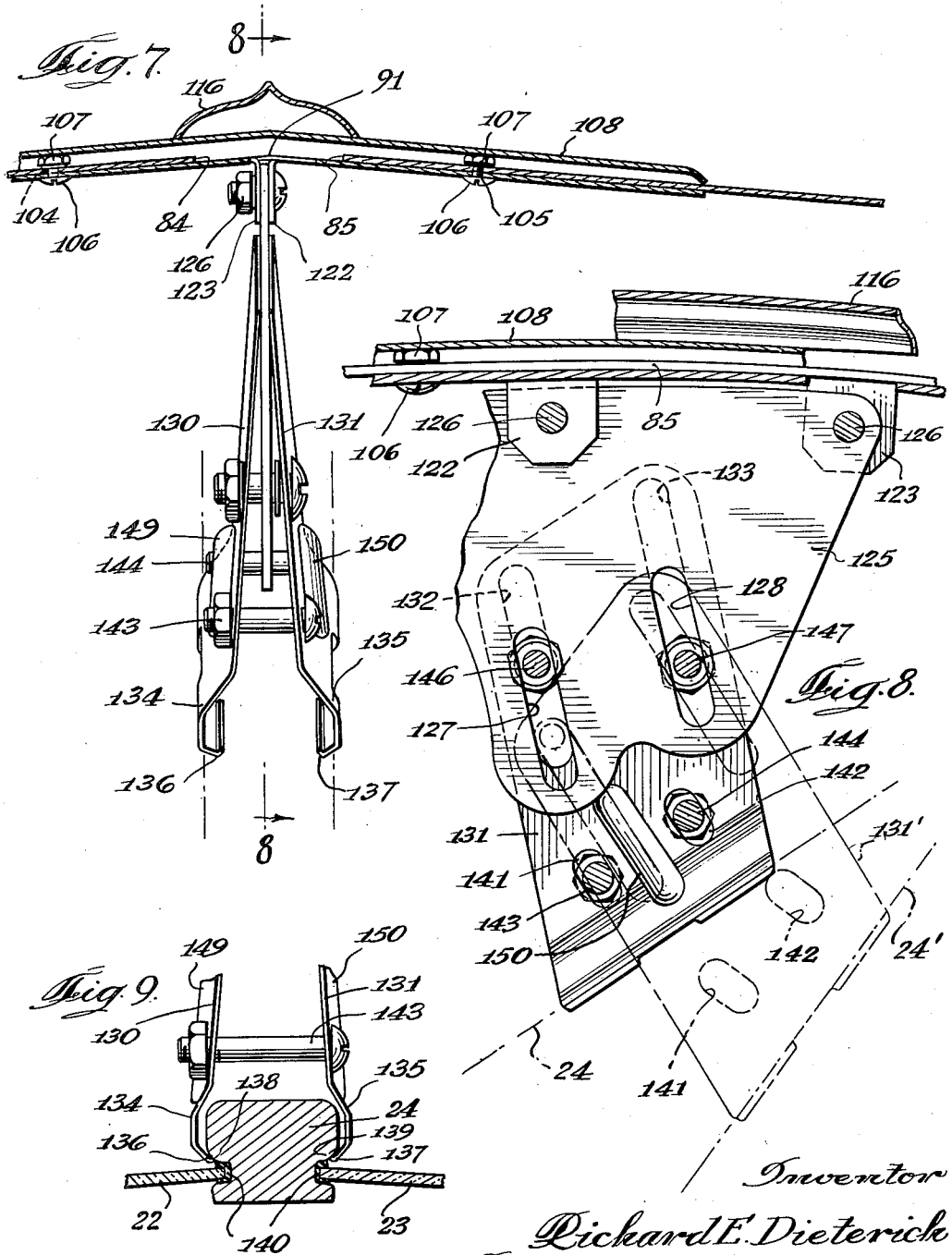

Patented Feb. 10, 1953

2,628,124

UNITED STATES PATENT OFFICE 2,628,124

VEHICLE WINDSHIELD SHADE

Richard E. Dieterich, Long Beach, Ind., assignor to Dieterich Products Corporation, Michigan City, Ind., a corporation of Illinois Application August 19, 1949, Serial No. 111,152

6 Claims. (Cl. 296—95)

1

This invention relates to an automobile windshield shade and more particularly is directed to a shade or awning which is intended to be secured to the exterior of the automobile for shading the occupants of said automobile.

The type of apparatus which is contemplated by this invention gives rise to many advantages with respect to the comfort of the occupants. The windshield of the vehicle is shaded from sun, glare, rain, snow, and the like. The interior of the automobile is cooler in hot weather. In winter, snow and ice are prevented from accumulating upon the windshield.

The above advantages are only a few of those which are achieved by the use of a visor of the type contemplated by my invention. Many other prior structures have achieved the same or similar advantages, but not without certain disadvantages. Prior structures have been such that vehicle visors or windshield shades embodying such prior structures have been costly, difficult to construct and attach, and in many cases have not been so arranged as to fit all the various makes of vehicles, whereby the owners of vehicles not capable of having such structures attached have been deprived of same.

My new invention obviates the disadvantages of prior structures in providing a cheap, simple, sturdy, easily attached or removed visor, which is capable of being attached to practically any model of automobile.

An important object of the invention is to provide a structure which will require considerably less parts than prior structures intended for the same purpose.

Another object of the invention is based upon the manner in which the length of the visor can be adjusted so that same is readily attachable to many different models of vehicles. Adjustability of prior visors was haphazard and consequently the visors detracted from the appearance of the vehicle when secured thereto. In my construction, the customer is provided with instructions as to the exact manner in which the visor is to be assembled to fit certain models of vehicles, and the parts of the visor are provided with indicia to enable the proper assembly for given lengths of visor as per instructions. In this manner I have achieved the object alluded to, namely, that I desire to provide a construction which although universal, will enhance the appearance of the vehicle to which same is attached by reason of the predetermined design thereof, and the indicia directing the proper assembly thereof in accordance with said predetermined design.

Still a further object of the invention is to provide a novel and improved manner of securing the wings of the visor one to the other by means of a connecting plate, and an additional object related thereto is the provision of connecting means between the wings which provide for the production of different lengths of visors.

An important object of the invention is to provide a novel manner of clamping the center of the visor to the windshield molding strip so as to secure same to practically any type of automobile construction, and as well to provide facile means for varying the height of the windshield visor above the windshield, and the pitch thereof.

Another object of the invention lies in the provision of novel means for clamping the visor to the rain gutters alongside the windshield.

Still another object of the invention is to provide novel clamping means for securing the visor to the rain gutters alongside the windshield of the vehicle which will include extremely simple, and yet highly effective means for adjusting the pitch of the windshield visor from the ends thereof.

With the foregoing and other objects in view which will appear as the description proceeds, the invention consists of certain novel features of construction, arrangement, and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a perspective view of a portion of an automobile showing my new visor secured thereto in shading relationship to the windshield.

Fig. 2 is a front-on elevational view of the same, but on an enlarged scale and showing the right hand portion of the visor.

Fig. 3 is a sectional view taken through the visor on a median line starting from the trailing edge and down the center, with the sectional line cutting through a portion of the left hand wing to show the construction thereof, said section being taken generally along the broken line 3—3 of Fig. 2 and in the indicated direction.

Fig. 4 is a perspective view taken of the central portion of the visor from the bottom thereof, parts being exploded to show the manner of assembly and arrangement.

Fig. 5 is a side elevational view of the end bracket assembly showing the manner in which the pitch of the visor can be adjusted to any desired angle.

Fig. 6 is a sectional view of the end bracket assembly of Fig. 5 but taken along the line 6—6 of Fig. 3 and in the indicated direction.

Fig. 7 is a sectional view taken generally through the center of the visor along the line 7—7 of Fig. 2 and in the indicated direction.

Fig. 8 is a sectional view taken through the center of the visor along the line 8—8 of Fig. 7 and in the direction indicated.

Fig. 9 is a partial front elevational view of the clamping means for securing the center of the visor to the center molding of the windshield, taken as indicated by the line 9—9 of Fig. 3, a portion of the windshield being shown in section for clarity.

Prior to entering upon a detailed discussion of the construction of my visor, it is desired to point out that a visor of this type must be capable of being secured to the vehicle either by the purchaser or a relatively unskilled workman. In order to assure safe and proper installation, the construction of the device must be such that it is almost impossible for any such installation to be done wrong. I have devised my new visor with these thoughts in mind. In addition, the visor should not be constructed in a manner that special tools are required to install and adjust the same. Consequently, my new visor can properly be secured to an automobile correctly and with a maximum of safety against slipping or blowing off by means of readily available standard tools.

Referring now to the drawings, and especially Figs. 1 and 2, the reference character 20 designates generally a vehicle such as an automobile, truck or the like having a windshield frame 21 mounting therein right and left, transparent windshield members 22 and 23 separated by a center windshield molding 24. In the particular model of vehicle 20 shown, the members 22 and 23 are arranged at an angle to one another forming a V-shaped structure intended to part the wind. Likewise, said windshield members 22 and 23 are slanted backwards from the bottoms thereof relative to the direction of forward movement of the vehicle 20.

The structure described is typical of the modern so-called streamlined automobile or truck cab, and the structure of windshield frame 21, windshield members 22 and 23, and center molding 24 is collectively termed the windshield.

The windshield frame 21 includes two outer framing posts 25 and 26 each of which terminates in a drip molding or rain gutter with which practically all modern vehicles are provided. I have designated the right hand gutter by the character 27 and the left hand gutter by the character 28. As shown in Fig. 6, the gutters comprise U-shaped troughs permanently secured alongside the vehicle 20, in any desired manner. Thus for example, the gutter 27 in Fig. 6 may be provided with a relatively wide extension 29 intended to engage the post 25 and be welded thereto as indicated at 30. The attachment is so secure and strong as to enable the visor 31 to be attached thereto with perfect safety, that is, without likelihood of the gutters 27 and 28 tearing loose at high speeds.

Generally speaking, the visor 31 is secured to the vehicle 20 by means of clamping brackets which attach to the rain gutters 27 and 28 on opposite sides of the vehicle 20 alongside the respective windshield framing posts 25 and 26, or as may hereinafter be stated, alongside the windshield. A third point of securement comprises the center of the windshield visor 31, which is attached to the center molding 24 in a manner to be described. All of the attaching means are capable of adjustment in order to achieve any desired height of the windshield visor 31 above the windshield, and in order to achieve any desired pitch of the visor. The pitch of the visor 31 may be defined for the purposes of this explanation, as the angle between the center of the visor and the line of the center molding 24. Such an angle is indicated as P in Fig. 3 and its extent controls the subtended vision angle available for the use of the driver. Obviously, the greater the angle, the greater the vision of the driver. This angle must be adjusted for the greatest comfort of the particular driver of the vehicle. I have constructed my visor to enable a wide variation of pitch angle P to be achieved in a simple manner. It is desired to point out that the angle of the center molding 24 with the vertical varies from model to model of vehicle as shown for example in Fig. 8.

The distance between the gutters 27 and 28 varies in the different kinds of vehicles, and I have likewise constructed my visor so as to enable same to be lengthened or shortened readily whereby a wide latitude in said distance can be achieved in assembling the visor.

Referring now to the details of my visor 31, same is formed of right and left wings 40 and 41, respectively, connected at their centers in a manner to be described, and having their outer ends secured to brackets 42 and 43, respectively, which in turn are secured to the gutters 27 and 28, respectively. In this manner the respective wings are spaced above and in shading relationship to the windshield members 22 and 23. The wings 40 and 41 are preferably curved in two planes in order to render the design thereof graceful and pleasing to the eye. In addition, the end portions 44 and 45 are curved downwardly relative to the body of the wings so as to form substantially vertically arranged plate portions. The plate portions are identical and opposite in formation, the left hand one being shown at 46 in Figs. 3 and 6 and the right hand one being shown at 47 in Fig. 5.

Referring now to Figs. 3, 5, and 6, the plate portions 46 and 47 each has a generally concave bottom edge 50 and 51 respectively to enable the same to fit into the respective gutters 27 and 28. At the point of attachment on most automobiles the gutters are curved as will be seen in Fig. 1 following the rounded contours of the vehicle. Each of the plate portions 46 and 47 is provided with slots 52 and each slot 52 has a punch nut 53 secured to the back thereof. The punch nuts 53 consist simply of hardened metal members having upset prongs 54 as shown in Fig. 6 intended to engage the helices of screws driven through the central opening about which said prongs are formed. This is well-known in the art and need not be further discussed.

The punch nuts 53 are each formed upon a strip of metal folded upon itself along the line 54 so that the second half 55 is disposed on the surface of the respective plate portion 46 or 47 opposite the punch nut 53. The punch nuts 53 are, therefore, frictionally engaged to the edges 50 and 51, respectively, with the folds 54 engaged in the respective gutters 27 and 28. This is best shown in Fig. 6.

The brackets 42 and 43 are formed identically except that one is right-handed and the other left. Referring now to Figs. 3 and 6, the bracket 42 has a boss portion 60 in order to support the head of the screw 61 which is driven through the bracket 42, an appropriate hole in the second half 55 of the strip forming the punch nut 53, the slot 52, and the punch nut 53. The lower edge of the bracket 42 is provided with lips 62 and 63 which are curled under the gutter 27 so that when the screws 61 are screwed home, the bracket 42 and the plate portion 46 will sandwich the gutter 27 therebetween and grip the same, securing the right hand end of the visor 31 to said gutter 27. In similar manner the bracket 43 and the plate portion 47 secure the left hand end of the visor 31 to the gutter 28.

The slots 52 enable the visor to be tilted relative to the gutters 27 and 28 prior to attachment, as shown in Fig. 5 and as indicated by the broken lines. The bracket 43 is shown in the same position at all times with its lower lips 72 and 73 engaged beneath the gutter 28. The solid lines show the plate portion 47 secured in one position and the broken lines show a different position 47' of the plate portion in which the pitch angle of the visor 31 has been decreased. In all constructional respects, the bracket 43 attaches to plate portion 47 as the bracket 42 attaches to plate portion 46.

The front and rear ends of the bracket members 42 and 43 are provided with flanges 56 which engage opposite edges of the plate portions 46 and 47 of the wings 40 and 41 respectively facilitating the engagement of said bracket members upon said plate portions 46 and 47.

Referring now to Fig. 4, the visor or panels 40 and 41 have their leading edges curled as shown at 80 and 81, respectively, so as to present a rounded edge to the wind and as well to enhance the appearance of the visor. The curls 80 and 81 also materially strengthen and stiffen the visor 31 in a well-known manner. The trailing edges are also provided with stiffening means, same taking the form of folds 82 and 83 which extend the entire length of the respective wings 40 and 41. The folds 82 and 83 are disposed upon the bottom of the panels and the curls 80 and 81 open to the bottom as well. Adjacent the inner edges 84 and 85 of the respective wings 40 and 41 the folds 82 and 83 are opened for a short distance to be spaced away from the under surface of the respective wings and forming thereby the slots 86 and 87 respectively which are intended to receive thereinto the trailing edge 88 of the adjusting plate 89.

In assembling the visor 31 the adjusting plate 89 above referred to serves to couple the wings 40 and 41 together as best shown in Fig. 4. The leading edge of the adjusting plate is curled as shown at 90 so that the said adjusting plate 89 can be telescoped into the ends of the wings 40 and 41. To that end, the curvature of the curled leading edges 80 and 81 of the wings, and the front to rear dimension of the adjusting plate 89 is less than the width of the wings 40 and 41 at their inner ends 84 and 85 so that the trailing edge 88 enters within the slots 86 and 87. It should be noted that the adjusting plate is cambered as best indicated at 91 in Fig. 7. The leading edge 90 is formed as a relatively obtuse V and the trailing edge 88 is generally formed as a parallel obtuse notch, said formation being best shown in Fig. 4. The result is that when the wings 40 and 41 are properly attached, they are engaged in a cambered swept back assembly which follows the general lines of the modern vehicle windshield.

The adjusting plate has a series of rows of perforations on either side of the ridge 91 which are indicated by the characters 95 and 96 in Fig. 4, applied to only the forward row on each side. There are two additional rows on each half of the plate 89 but said perforations are identically placed in spaced rows and hence need not be individually designated by reference characters. The central rows are generally indicated by the character 97 and the rear rows by the character 98. The forward rows of perforations 95 and 96 are provided with indicia engraved in the underside of the plate 89, as shown in Fig. 4 at 99 and 100 for the purpose of assembling the visor 31 to proper length. The indicia 99 can be different letters marking the perforations 95 and the indicia 100 are the identical letters in reverse order. Thus, starting from the center 91 the succeeding perforations in both directions are marked "A," "Y," "B," "X," "C," "D," accounting for six perforations on either side. The rows 97 and 98 need not be marked, since it would be obvious for example that the third perforation on each side of center 91 and in every row would be the "B" perforation and so on.

By experiment and measurement, the manufacturer of the visors 31 can determine the proper perforations to be used for attaching the visor 31 to any model vehicle and can supply such information to the purchaser.

Obviously, the wings are prevented from moving transversely of one another when assembled to the adjusting plate 89. As to longitudinal movement, this is prevented by reason of the attachment of the wings 40 and 41 to the plate 89. Each wing is provided with perforations 104 and 105, respectively, spaced inwardly of the respective edges 84 and 85 aligned with the rows of perforations 95, 97, and 98 so that the wings 40 and 41 may be secured to the adjusting plate 89 by means of bolts 106 passing through the perforations 104 and 105 and any series of appropriate perforations of the plate 89 with which same were previously aligned. In Fig. 4 for example, the right hand wing 40 is shown with its perforations 104 aligned with the "X" perforations and secured thereto by bolts 106. It will be obvious from Fig. 7 that the bolts 106 are relatively short and that the nuts 107 used to secure the same are relatively thin. The nuts 107, it will be noted, are secured upon the top surface of the visor 31 and are hidden in a manner presently to be described.

There is provided a cover plate member 108 which is substantially the identical shape and size as the adjusting plate 89 except that in addition to the curled leading edge 109 there is provided a depending flange 110 upon the trailing edge so that after the wings 40 and 41 are assembled to the adjusting plate, the curled edge 109 is hooked over the joint formed between curled edge 90 and curled edges 80 and 81 covering the same, and the trailing edge flange 110 is engaged over the rear joint. The nuts 107 are thus all covered. The cover plate member 108 is provided with a perforation 112 aligned with a similar perforation 113 in the center 91 of the adjusting plate 89 for accommodating a bolt and nut assembly 115 which is secured therethrough to assemble the cover plate member 109 to the visor 31. I may provide an ornamental medallion 116 provided with a curled leading edge 117 and a flanged trailing edge 118 which medallion can be engaged over the ridge of the visor 31 and be secured by the bolt and nut assembly 115. An appropriately aligned countersunk perforation 119 may be provided in medallion 116 for the head of the bolt 115.

The adjusting plate 89 is provided at appropriate places with strengthening ribs 120 as best shown in Fig. 4. Along the central ridge 91 there are provided three ears 121, 122 and 123 which are punched from the body of the adjusting plate. The ears 121 and 123 are arranged on one side of center 91 while the ear 122 is on the side opposite, leaving space therebetween for the thickness of a central support plate or fin 125 which is secured to the ears by bolts 126 and thereby rigidly held to the adjusting plate 89. The center support plate or fin 125 is generally triangular in formation, and is formed of a single member of metal. It eliminates the strips or straps formerly used to secure the center of visors of this general construction, and is not likely to break, bend, buckle, or tear loose. Furthermore, since the base of the triangle is secured to the underside of the plate 89 there is provided a rigid construction for the visor panels 40 and 41, preventing noise and vibration. By reason of the front-to-rear dimension of the fin 125, it is possible to secure a broad clamping device thereto as will be described, which also materially aids in the sturdiness of the resulting construction.

The fin 125 is provided adjacent its lower end with a pair of parallel slots 127 and 128 which are arranged at an angle relative to the surface of the adjusting plate 89 approaching a perpendicular to the center windshield molding 24 to enable a maximum of adjustment of the clamping members presently to be described.

The clamping members 130 and 131 consist of identical members formed right and left handed. They are generally of parallelogram formation with parallel slots 132 and 133 arranged along the length thereof spaced apart the same distance as the slots 127 and 128. The bottom ends of the members 130 and 131 are flared outwardly as shown in Figs. 7 and 9 and designated 134 and 135 to enable the clamping members 130 and 131 to clear the center windshield molding 24. The outwardly flared portions 134 and 135 terminate in inwardly turned sharp edges 136 and 137 which are intended to be engaged under the bottom edges 138 and 139 of the molding 24 between the rubber grommets 140 and the molding 24. Adjacent the flared portions 134 and 135 each member 130 and 131 is provided with a pair of slots 141 and 142 for the accommodation of bolts 143 and 144 which are tightened to cause the sharp ends 136 and 137 to exert a gripping engagement as described. As shown in Fig. 4, the bolt assemblies 143 and 144 include lock washers and nuts in accordance with usual practise. A center slot may be provided in each of the edges 136 and 137 as shown at 145 in case the windshield center molding 24 is curved. There are provided adjusting bolt assemblies 146 and 147 which pass through the slots 127 and 132, and the slots 128 and 133 respectively. The arrangement described permits a wide latitude of adjustment for different pitches of the visor or angles of the center molding 24. For example, I have shown in Fig. 8 a broken line 24' representing a center molding of a different model vehicle having a variation in its angle, and the broken line outline 131' showing the position which would be assumed by the clamping members 130 and 131 in being accommodated to the vehicle having the strip 24'.

If desired the members 130 and 131 may be provided with strengthening ribs 149 and 150.

In installing the visor 31, the wings 40 and 41 and the adjusting plate 89 are assembled, after which the cover plate 108 and medallion 116 are secured. Following this, the end brackets 42 and 43 are loosely secured to the end plate portions 46 and 47 of the visor 31 and placed in the rain gutters 27 and 28 respectively, being loosely mounted therein. It is presumed that proper marks have been made to indicate proper position of the visor 31. The clamping members 130 and 131 have previously been loosely attached to the center support plate 125, and the knife edges 136 and 137 are placed between the molding 24 and the rubber grommets 140, with the visor at the desired pitch angle P. Thereafter the bolt assemblies 143 and 144 are tightened; then the bolt assemblies 146 and 147 tightened; and finally the screws 61 driven home.

It is believed that this invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of this invention as defined in the appended claims.

What is claimed and desired to be secured by Letters Patent of the United States is:

1. In a device of the character described and comprising a windshield shade adapted to be secured in shading relationship to a vehicle having a windshield with rain gutters alongside the windshield on opposite sides of the vehicle, a pair of panel members each having its outer end adapted to be engaged within the respective gutters on opposite sides of the vehicle and secured thereto with the said panels in spaced relationship with said windshield, and having the inner ends juxtaposed, a plate member secured between the inner ends of the said panel members and coupling same together, said panel members each having a curled leading edge and having slots on its trailing edge adjacent the inner ends thereof, and said plate member being provided with a curled leading edge and being telescoped into the inner ends of each panel with its curled leading edge engaged in the curled leading edges of the panels, and its trailing edge engaged within the slots of the panels, and means holding the panels and plate member in assembly, said plate member having a single supporting fin secured thereto on the bottom thereof and extending towards the center of the windshield, said fin being generally triangular in formation with the base of the triangle secured to the plate member and the apex extending towards the windshield, and clamping means adjustably secured to the said fin and secured to the center of the windshield.

2. In a device of the character described and comprising a windshield shade adapted to be secured in shading relationship to a vehicle having a windshield with rain gutters alongside the windshield on opposite sides of the vehicle, a pair of panel members each having its outer end adapted to be engaged within the respective gutters on opposite sides of the vehicle and secured thereto with the said panels in spaced relationship with said windshield, and having the inner ends juxtaposed, a plate member secured between the inner ends of the said panel members and coupling same together, said panel members each having a curved leading edge and having slots on its trailing edge adjacent the inner ends thereof, and said plate member being provided with a curled leading edge and being telescoped into the inner ends of each panel with its curled leading edge engaged in the curled leading edges of the panels, and its trailing edge engaged within the slots of the panels, and means holding the panels and plate member in assembly, said plate member having a single supporting fin secured thereto on the bottom thereof and extending towards the center of the windshield, said fin being generally triangular in formation with the base of the triangle secured to the plate member and the apex extending towards the windshield, and clamping means adjustably secured to the said fin and secured to the center of the windshield, said fin having a pair of parallel slots and said clamping means likewise having a pair of parallel slots, and fastening means extending through the slots to provide for rotational movement of said clamping means relative to said fin to enable same to be secured in a wide variety of positions relative thereto.

3. In a device of the character described and comprising a windshield shade adapted to be secured in shading relationship to a vehicle having a windshield with rain gutters alongside the windshield on opposite sides of the vehicle, a pair of panel members each having its outer end adapted to be engaged within the respective gutters on opposite sides of the vehicle and secured thereto with the said panels in spaced relationship with said windshield, and having the inner ends juxtaposed, a plate member secured between the inner ends of the said panel members and coupling same together, said panel members each having a curled leading edge and having slots on its trailing edge adjacent the inner ends thereof, and said plate member being provided with a curled leading edge and being telescoped into the inner ends of each panel with its curled leading edge engaged in the curled leading edges of the panels, and its trailing edge engaged within the slots of the panels, and means holding the panels and plate member in assembly, said plate member having a single supporting fin secured thereto on the bottom thereof and extending towards the center of the windshield, said fin being generally triangular in formation with the base of the triangle secured to the plate member and the apex extending towards the windshield, and clamping means adjustably secured to the said fin and secured to the center of the windshield, said fin having parallel slots arranged at an angle with the plane of the said plate member, and said clamping means having a pair of parallel slots spaced apart the same distance as the first mentioned parallel slots, and fastening means extending through a first slot of the first mentioned pair and a first slot of the second mentioned pair, and through the remaining slot of each pair, whereby the clamping means can be rotated a limited amount relative to the fin prior to securing the fastening means in order to secure the clamping means to the center of the windshield regardless of the inclination thereof.

4. In a device of the character described and comprising a windshield shade adapted to be secured in shading relationship to a vehicle having a windshield with rain gutters alongside the windshield on opposite sides of the vehicle, a pair of panel members each having its outer end adapted to be engaged within the respective gutters on opposite sides of the vehicle and secured thereto with the said panels in spaced relationship with said windshield, and having the inner ends juxtaposed, a plate member secured between the inner ends of the said panel members and coupling same together, said panel members each having a curled leading edge and having slots on its trailing edge adjacent the inner ends thereof, and said plate member being provided with a curled leading edge and being telescoped into the inner ends of each panel with its curled leading edge engaged in the curled leading edges of the panels, and its trailing edge engaged within the slots of the panels, and means holding the panels and plate member in assembly, said plate member having a single supporting fin secured thereto on the bottom thereof and extending towards the center of the windshield, said fin being generally triangular in formation with the base of the triangle secured to the plate member and the apex extending towards the windshield, and clamping means adjustably secured to the said fin and secured to the center of the windshield, said clamping means comprising a pair of mating members having sandwiching portions adapted to be disposed and fastened upon opposite sides of the fin, and terminating at the bottom thereof in flared portions having hooked ends for seizing a center molding strip of said windshield.

5. In a device of the character described and comprising a windshield shade adapted to be secured in shading relationship to a vehicle having a windshield with rain gutters alongside the windshield on opposite sides of the vehicle, a pair of panel members each having its outer end adapted to be engaged within the respective gutters on opposite sides of the vehicle and secured thereto with the said panels in spaced relationship with said windshield, and having the inner ends juxtaposed, a plate member secured between the inner ends of the said panel members and coupling same together, said panel members each having a curled leading edge and having slots on its trailing edge adjacent the inner ends thereof, and said plate member being provided with a curled leading edge and being telescoped into the inner ends of each panel with its curled leading edge engaged in the curled leading edges of the panels, and its trailing edge engaged within the slots of the panels, and means holding the panels and plate member in assembly, said plate member having a single suporting fin secured thereto on the bottom thereof and extending towards the center of the windshield, said fin being generally triangular in formation with the base of the triangle secured to the plate member and the apex extending towards the windshield, and clamping means adjustably secured to the said fin and secured to the center of the windshield, said clamping means comprising a pair of mating members having sandwiching portions adapted to be disposed and fastened upon opposite sides of the fin, and terminating at the bottom thereof in flared portions having hooked ends for seizing a center molding strip of said windshield and means adjacent the flared portions for drawing same together.

6. In a windshield shading device which is adapted to be secured in spaced relationship to the windshield of an automobile provided with gutters alongside of the windshield, and including a pair of panel members coupled to one another at the center of the windshield, said panel members being relatively flat across the windshield, but curved at the opposite ends thereof and each being provided with an integrally formed plate portion arranged substantially perpendicular to the windshield and terminating in a concave edge adapted to be disposed in the respective gutters, slotted perforations in said plate portions, and a bracket member engaged against the plate portion and having ears adapted to engage beneath the gutter and fastening means having a helix passing therethrough engaging said perforations and adapted to be secured to the plate portion to hold same to the gutter, each perforation having a folded metallic strip sandwiching the adjacent edge of the respective plate portion and having helix receiving prongs and a socket aligned with the slot, the brackets having openings, each aligned with the socket whereby said fastening means passes through the said openings into the socket and engages the prongs, said concave edge conforming to the curve of the gutter at the point of engagement therewith.

RICHARD E. DIETERICH.

REFERENCES CITED

The following references are of record in the file of this patent:

UNITED STATES PATENTS

| Number | Name | Date |
|---|---|---|
| 827,483 | Voorhees | July 31, 1906 |
| 1,455,830 | Bauer | May 22, 1923 |
| 2,399,957 | Tinnerman | May 7, 1946 |
| 2,447,246 | Groboski | Aug. 17, 1948 |
| 2,497,050 | Thibault | Feb. 7, 1950 |
| 2,500,406 | Greenfield | Mar. 14, 1950 |
| 2,506,108 | Riemann | May 2, 1950 |
| 2,507,397 | Bracken | May 9, 1950 |